United States Patent [19]

Schmode et al.

[11] Patent Number: 5,572,911
[45] Date of Patent: Nov. 12, 1996

[54] STRIPPING DEVICE

[75] Inventors: Hartmut Schmode, Blomberg; Ulrich Wiebe, Dorentrup; Armin Herzog, Detmold; Joachim Kornfeld, Vlotho; Bernd David, Detmold; Detlev Hetland, Detmold; Günther Hanning, Detmold; Siegmund Gernot, Detmold; Thorsten Bornefeld, Schlangen, all of Germany

[73] Assignee: Weidmuller Interface GmbH & Co., Detmold, Germany

[21] Appl. No.: 478,771

[22] Filed: Jun. 7, 1995

[30] Foreign Application Priority Data

Jun. 8, 1994 [DE] Germany .......................... 44 20 050.1

[51] Int. Cl.⁶ ..................................................... H02G 1/12
[52] U.S. Cl. ............................................................. 81/9.43
[58] Field of Search ........................... 81/9.4, 9.41, 9.42, 81/9.43, 9.44

[56] References Cited

U.S. PATENT DOCUMENTS

| | | | |
|---|---|---|---|
| 3,596,541 | 8/1971 | Bieganski | 81/9.43 |
| 4,072,069 | 2/1978 | Bieganski | 81/9.43 |
| 4,197,768 | 4/1980 | Undin | 81/9.43 |
| 4,377,954 | 3/1983 | Schulze | 81/9.43 |
| 4,485,696 | 12/1984 | Bieganski | 81/9.41 |
| 5,491,894 | 2/1996 | Bieganski | 81/9.43 |

FOREIGN PATENT DOCUMENTS

| | | |
|---|---|---|
| 0253528 | 1/1988 | European Pat. Off. . |
| 2827587 | 6/1978 | Germany . |

Primary Examiner—D. S. Meislin

[57] ABSTRACT

A device for stripping conductor ends contains two stripping devices arranged in a mouth formed by clamping jaws. The two stripping devices can be displaced in a longitudinal direction of the mouth. At least one of the stripping devices includes a stack of laminates which are located side by side. The stack can be moved transversely with respect to the longitudinal direction of the mouth and has cutting edges which penetrate into insulation of a conductor which is held by the clamping jaws when the mouth is closed. A laminate guidance device is matched to the profile of the conductor and controls the laminate transverse movement in a corresponding manner. The laminate guidance device is located on the rear side of the laminate stack.

20 Claims, 8 Drawing Sheets

STRIPPING DEVICE

BACKGROUND OF THE INVENTION

1. Field of the Invention

The invention relates to a device for stripping conductor ends.

2. Description of Related Art

A device for stripping conductor ends is disclosed in German Patent 2,827,587. This known device is designed as stripping pliers and has a pair of cutting and stripping claws arranged in the region of the mutually opposite ends of the limbs of the pliers. These cutting and stripping claws each comprise laminates which are combined to form a stack and are manufactured from steel sheet. Each of the stripping claws is designed to be resiliently elastic in the movement direction of the limbs of the pliers, by virtue of its shaping. Each has a main body which extends essentially parallel to the limb of the pliers, is mounted resting against the respective limb of the pliers at its end facing the rotation point of the pliers and can be pivoted in a sprung manner through a small angle with respect to said limb of the pliers. On the gap in the region of the end of the respective limb of the pliers, the main body furthermore has a cutting projection which extends essentially at right angles to the main body. The cutting projection is designed integrally with the main body and has a cutting edge. On the side which is immediately opposite the cutting projection and faces the limb of the pliers, the device has a support which is likewise designed integrally with the main body and is used as a stop. Blades which are formed from the cutting edges of the laminates of the two stacks rest against one another on a straight line in the quiescent position when the limbs of the pliers are closed.

If the end of a conductor which is to be stripped is clamped in the mouth of the pliers, then the laminates are bent to a greater or lesser extent by the conductor, with their cutting edges penetrating into the conductor insulation. However, since all the laminates have the same elasticity and the pressure force reduces radially outwards, starting from the center of the conductor, along the cutting straight line formed by the cutting edges, there is a risk of the cutting edges of the laminates located on the outside not penetrating far enough into the conductor insulation, and thus of a poor stripping result being obtained.

SUMMARY OF THE INVENTION

The invention is based on the object of developing the device of the type mentioned initially such that conductors can be stripped more reliably and cleanly.

This and other objects may be achieved by providing a device having a laminate guidance device, which is matched to the profile of the conductor and determines the laminate transverse movement in a corresponding manner, is located on the rear side of the laminate stack.

The laminates, which can be rigid or, to a greater or lesser extent, elastic, are guided by this laminate guidance device such that, when pressure is applied by the conductor, they can no longer flex so severely in the edge region of the conductor as in the central region of the conductor. Excessive pivoting away or deflection of the laminates in the edge region of the conductor is thus virtually prevented by the laminate guidance device, so that these laminates which are located in the edge region of the conductor can penetrate to a greater extent into the conductor insulation, which leads to a better stripping result. If the laminates have a certain amount of intrinsic elasticity, then conductors can also be stripped having a profile to which the laminate guidance device is not entirely exactly matched. However, those laminates which are in each case located on the outside always penetrate with their cutting edges better into the conductor insulation here as well, so that more satisfactory results are possible in this case as well.

It is within the context of the invention for it to be possible to equip both stripping devices with such laminate cores, but for it also to be possible for only one of the stripping devices to have such a laminate stack, while the other one of the stripping devices is equipped, for example, with a conventional laminate stack.

The laminate transverse movement is in this case a movement which is located in the plane of the stripping devices or in the mouth plane and takes place towards the mouth and away from it.

According to a very advantageous development of the invention, the laminate guidance device is mounted such that it can pivot. It can thus be pivoted during the mouth closing process in order to act on the laminates now for the first time and to limit their laminate transverse movement so that the laminates do not need to be subjected permanently to a laminate adjusting force which is not produced by the conductor. This leads to a lower energy quiescent state of the device and thus to less wear.

The laminate guidance device can be part of a clamping jaw to which, for example, the laminate guidance device is integrally connected. The laminate guidance device is then pivoted by pivoting the clamping jaw. If, for example, the clamping jaw is of L-shaped design and it has a long horizontal limb as well as a short vertical limb, then the laminate guidance device can be provided on the free end of the long limb, for example in the form of a V which is incorporated at the end in the long limb. If the laminate stack comes to rest on the long limb of the clamping jaw, then the individual laminates of the laminate stack lie on that edge of the long limb defined by the V and their pivoting position is preset by this edge. Other geometries can also be used instead of the V, in order to prevent deviation of the laminates in accordance with a different function or a different geometry. The clamping jaw is in this case mounted in the region of the laminate guidance device, that is to say in the region of the V, such that it can pivot.

During pivoting of the clamping jaw, in order to ensure that its short limb or clamping limb is in a vertical position, the clamping jaw can itself be designed in an articulate manner, for example in the connecting region between the short limb and long limb.

It is also possible to position the clamping jaw at various positions which do not differ widely from one another in the mouth longitudinal direction in order in this way to be able to match the clamping and cutting forces still more precisely to existing conditions, for example to conductor insulation hardnesses, and the like. Displacement of the clamping jaw in the mouth longitudinal direction also displaces the position of the laminate guidance device, which then leads to a different deflection behaviour of the individual laminates and thus to different cutting and clamping forces.

According to a further very advantageous refinement of the invention, the laminate stack can be displaced in a sliding manner in the mouth longitudinal direction on the laminate guidance device, the horizontally located laminate base being raised towards the cutting edge in the front laminate region. If the laminate stack is moved beyond the laminate guidance device in the mouth longitudinal direction when the laminate guidance device is pivoted, then, because of the raised laminate base, each of the laminates can be deflected somewhat further and can thus be moved a little away from the conductor when the insulation is drawn away from it. This prevents the cutting edges of the laminates scratching the remaining conductor end while the insulation is being drawn off.

The laminate stack is preferably mounted in a laminate cassette such that it can pivot, which laminate cassette is connected to a tie rod which can be displaced in the mouth longitudinal direction. This tie rod can be driven by suitable operating means in order to move the laminate cassette backwards and forwards in the mouth longitudinal direction. In this case, the other of the two stripping devices can likewise be coupled to the tie rod, so that it can also move corresponding to the movement of the laminate cassette.

A compression spring is advantageously provided between this other stripping device and the laminate cassette and presses the laminate cassette against guide surfaces on which it is mounted so that it can be pushed. These guide surfaces can be provided, for example, on the housing of the device.

In order to apply suitable clamping and cutting forces, a spring is advantageously arranged on the rear side of the clamping jaw, which is provided with the laminate guidance device, which spring presses the clamping jaw in the direction of the mouth and can be, for example, a leaf spring which runs in the mouth longitudinal direction and is mounted at the rear mouth end. The clamping jaw which has the laminate guidance device is in this case arranged between stationary housing parts against which the other clamping jaw is moved during closure of the mouth.

If a conductor end which is to be stripped is located in the mouth, then the conductor is clamped between the clamping jaws while the mouth is closed, that clamping jaw which is arranged between the stationary housing parts flexing, to be precise corresponding to the force of the spring provided under it. This pivoting of the clamping jaw also results in the laminate guidance device being pivoted, as a result of which the maximum deflection of the laminates of the laminate stack is determined. After complete closure of the mouth and after the conductor insulation has been cut through, the laminate cassette is then displaced, with the laminate stack, relative to the clamping jaw, the laminates sliding beyond the laminate guidance device and gradually being removed from the conductor core again. However, as before, the cutting edges of the laminates in this case engage behind the insulation piece which has been cut off in order to draw it off the conductor. After reaching the limit position and after the insulation has been drawn off the conductor, the clamping jaws return to their original position, and the laminate stack is returned to its position located at the front of the mouth without being acted on by the laminate guidance device, so that the laminates of the laminate stack are now no longer displaced or twisted relative to one another.

According to a refinement of the invention, the device can be designed as pliers which have two handles, by means of which pliers the mouth is closed when the handles are moved together and the tie rod is guided to the rear end of the pliers, and vice versa. However, the device can also be designed as a fixed device which can be installed, for example, permanently on a table. An electrical device, for example an electric motor or the like, can also be used instead of a mechanical drive for the clamping jaws and the stripping devices as well as for the drive of the tie rod. The electrical drive can be power supply operated or battery operated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is explained in more detail in the following text, with reference to the drawings, in which.

DETAILED DESCRIPTION OF THE PREFERRED EMBODIMENTS

The invention is described in detail in the following text, with reference to exemplary embodiments. In this case, the device is itself designed in the form of hand-held pliers. However, as already mentioned, it can also be a fixed apparatus or table apparatus.

A first exemplary embodiment of hand-held pliers is shown in FIGS. 1 to 5.

Figure 1:
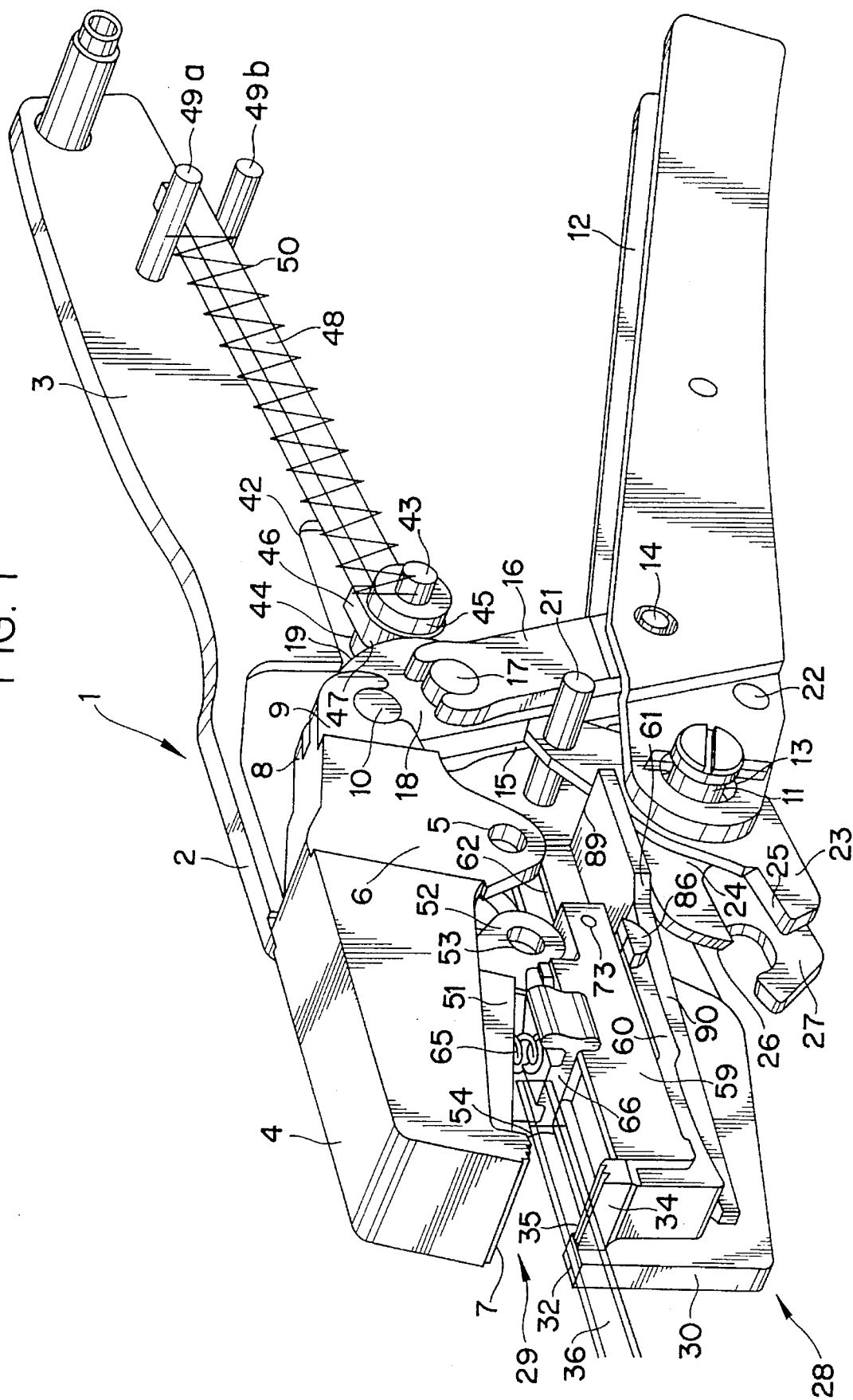
FIG. 1 shows a device, which is designed like pliers, according to the invention having a partially removed housing.
Figure 2:
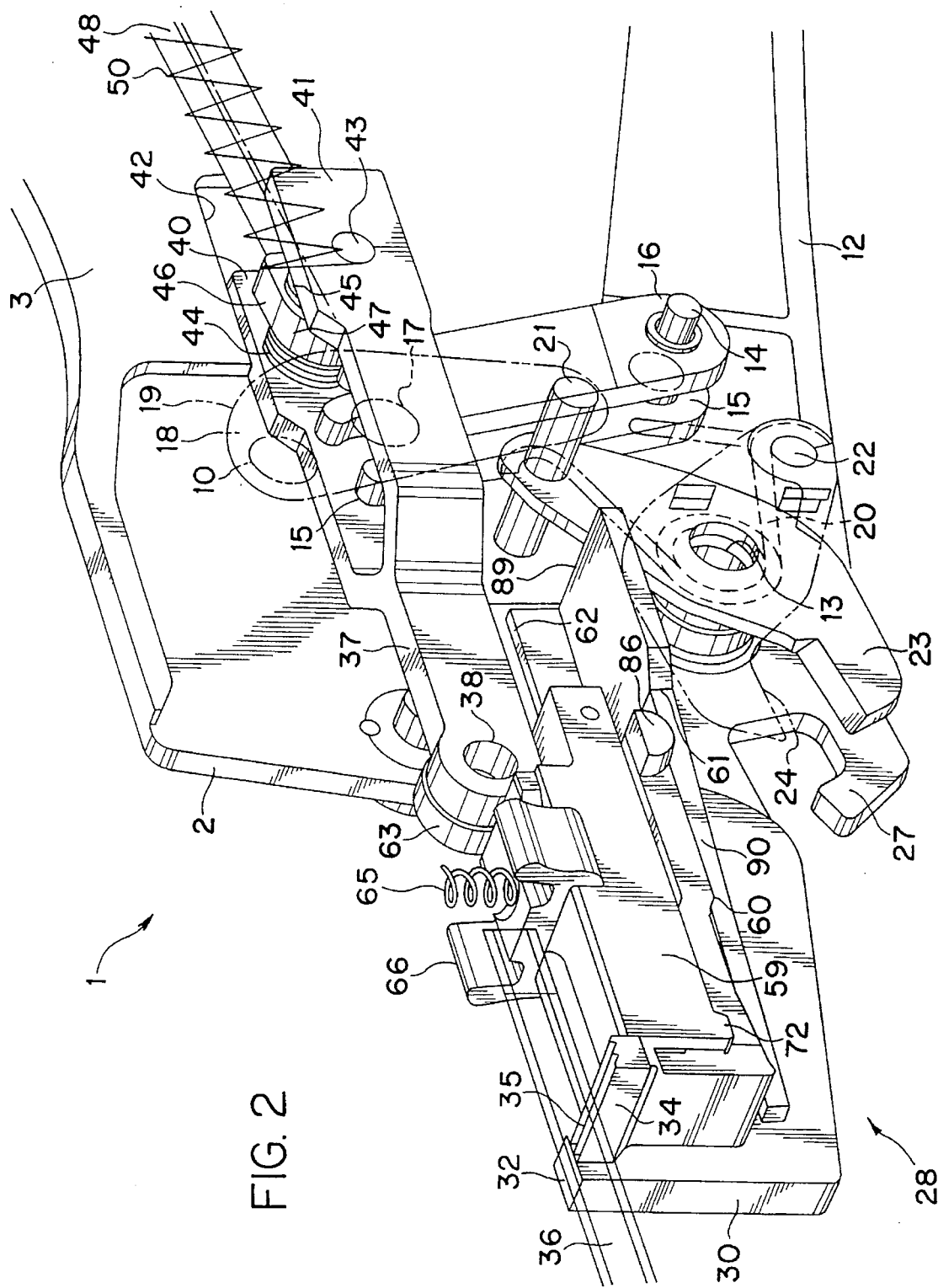
FIG. 2 shows the pliers according to FIG. 1 without the upper clamping jaw and upper stripping device.

According to FIG. 1 and 2, the hand-held pliers 1 have a pliers housing 2 to which a handle 3, which is fixed to the housing 2, is, for example, integrally connected. These figures show only the rear wall of the pliers housing 2, a front wall also being provided as well, of course. A corresponding situation applies to the handle 3 which is fixed to the housing. A moving clamping jaw 4 is mounted on the pliers housing 2 such that it can pivot, to be precise by means of a bearing pin which is not illustrated, passes through holes 5 in the clamping jaw 4 and rests in holders which are located on the opposite insides of the housing walls of the pliers housing 2. The Holes 5 are located in two side walls 6, which are at a distance from one another, of the clamping jaw 4. These side walls 6 resting against the insides of the housing walls of the pliers housing 2 and are guided thereby. At the front end, the moving clamping jaw 4 is designed like a claw and has a clamping surface 7, which has grooves. The grooves running parallel to the central axis of the holes 5. In contrast, there are two side wall pieces 8 and 9 at the end of the moving clamping jaw 4 opposite the clamping surface 7. The side wall pieces 8 and 9 are arranged at a distance from one another and are used for holding a pivoting pin 10 which likewise extends parallel to the holes 5. In this case, the side wall pieces 8 and 9 can have corresponding recesses for the pivoting pin 10 on their lower side the pivoting pin 10 can be inserted in a clamping manner into the recesses, so that the side wall pieces 8 and 9 engage around the pivoting pin 10 like claws.

A further pivoting pin 11, which is likewise mounted by means of both ends in the mutually opposite side walls of the pliers housing, is located on the lower pliers housing 2 and at a distance under the holes 5. A moving handle 12 can rotate about this further pivoting pin 11. In this case, the moving handle 12 has at its one end a hole 13 through which the further pivoting pin 11 projects. A further pivoting pin 14, on which two sliding levers 15 and 16 which are at a distance from one another are mounted such that they can pivot, is located in the handle 12 a short distance away from the further pivoting pin 11, to be precise seen in the direction of the rear free end of the handle 12. These sliding levers 15 and 16 are arranged offset with respect to one another in the longitudinal direction of the further pivoting pin 14 and have at their free end claw-like formed-out regions in which a pivoting pin 17 is mounted. This pivoting pin 17 is fitted in its central region with a sliding element 18 which is located between the sliding levers 15 and 16, and also comes to rest between the side wall pieces 8 and 9. At the same time, the pivoting pin 10 also passes through the sliding element 18 at a predetermined distance from the pivoting pin 17. In other words, the further pivoting pin 14, the sliding levers 15 and 16, the pivoting pin 17, the sliding element 18, the pivoting pin 10 and the side wall pieces 8 and 9 form a toggle-lever joint. The sliding element 18 is in this case designed to be convex in the direction towards the rear end of the pliers. Here, it has an effective surface 19 running in a convex shape.

FIG. 1 shows the pliers in the open state, that is to say in a situation in which the handles 3 and 12 are at the maximum distance from one another. If the handles 3 and 12 are moved towards one another, then the handle 12 is moved in the anticlockwise direction about the pivoting pin 11 and presses the sliding levers 15 and 16 upwards in the direction of the handle 3 which is fixed to the housing. At the same time, the toggle-lever joint is deflected to the rear in the direction of the free end of the handle 3 while, at the same time, the sliding element 18 rotates the moving clamping jaw 4 about its pivoting axis, which passes through the holes 5, to be precise likewise anticlockwise. If the handles 3 and 12 are released, a reverse movement process takes place. A spring 20, which can be identified in FIG. 2, is provided in order to move the handle 12 back into its original position. This spring 20 is wound around the further pivoting pin 11 and, on one hand, its one end engages around a pin 21 which is fixed to the housing, while its other end engages around a pin 22. The pin 22 is provided on the moving handle 12, to be precise, in the region between the further pivoting pin 11 and the pivoting pin 14. If the handles 3 and 12 are moved towards one another, the spring 20 is tensioned. If the handles 3 and 12 are released, in contrast, it presses the handle 12 anticlockwise about the pivoting pin 11, via the pin 22. This movement of the handle 12 is then limited by a suitable stop or by the limit position of the toggle-lever joint.

As can furthermore be seen from FIGS. 1 and 2, a stationary blade element 23 is also arranged on the pin 21 which is fixed to the housing. In contrast, the other end, which overhangs the pivoting pin 11, of the handle 12 is designed as a further blade element 24, both blade elements 23 and 24 having cutters 25 and 26 which point towards one another so that a cutting device is in this way obtained which closes when the handle 12 is moved towards the handle 3, and vice versa. A support 27 is fixed to the housing and is used for positioning material in the form of strands, which is intended to be cut using the cutting device.

Figure 6:
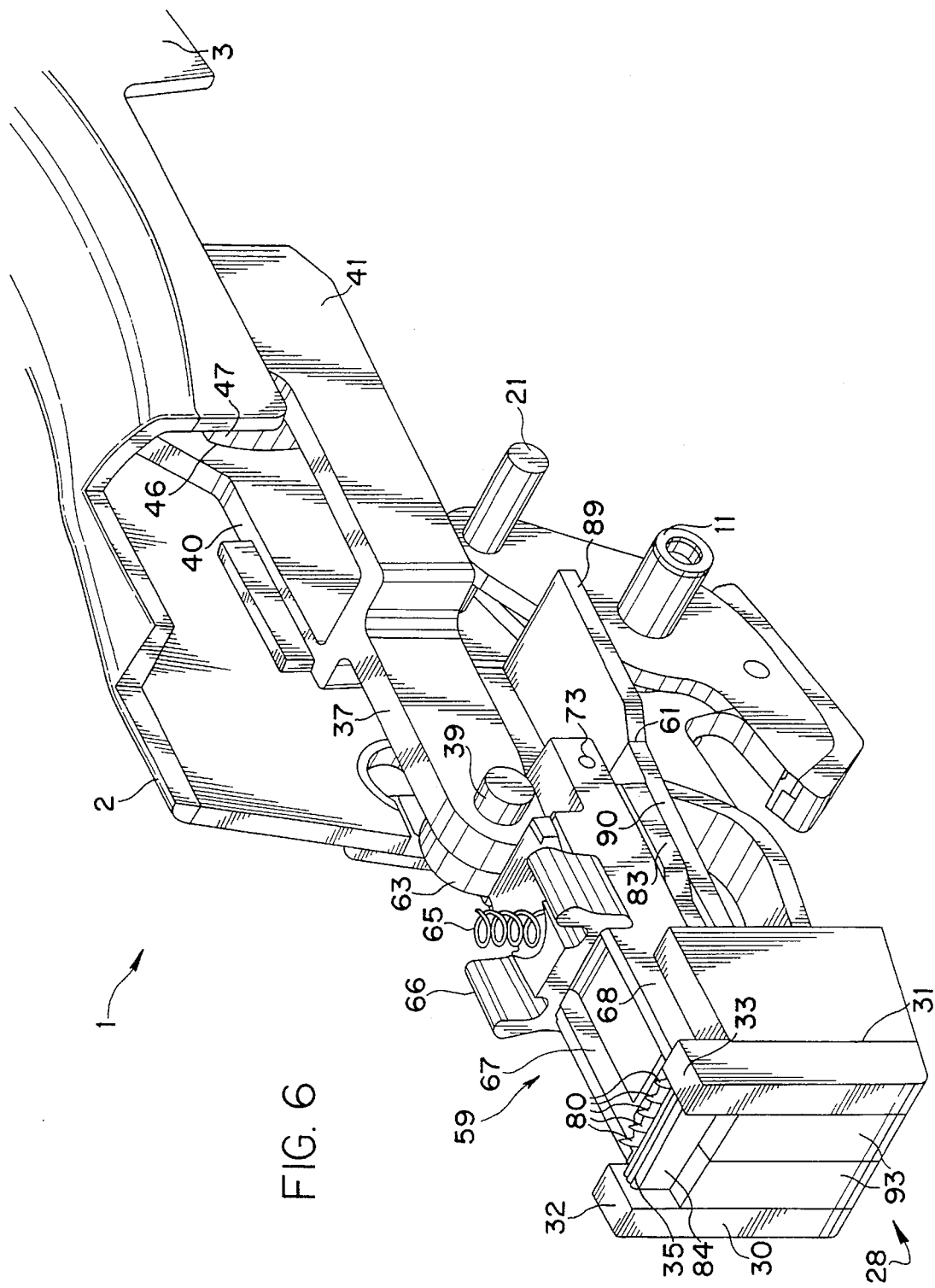
FIG. 6 shows a perspective view of stripping pliers according to a further exemplary embodiment of the invention.
Figure 7:
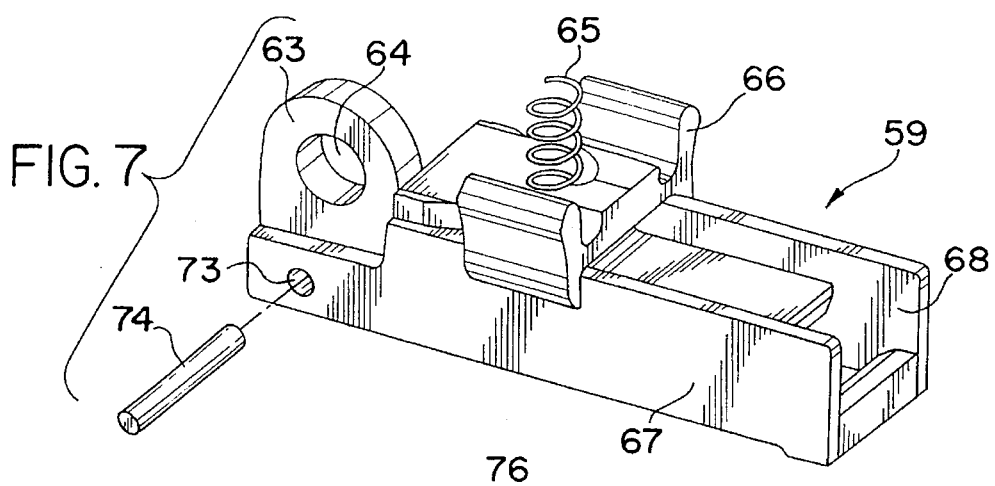
FIG. 7 shows a laminate cassette corresponding to FIG. 3.
Figure 8:
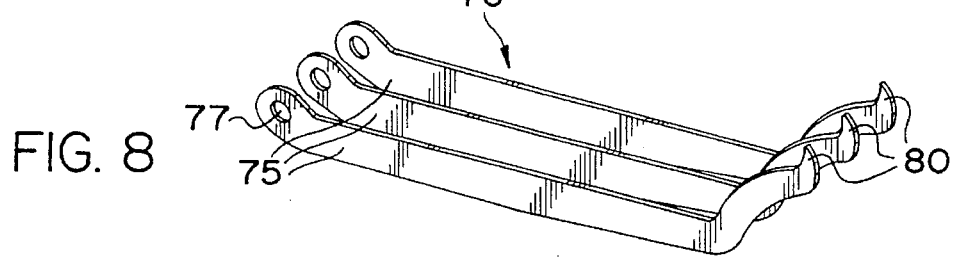
FIG. 8 shows a laminate stack for the laminate cassette according to FIG. 7.

The pliers have a second or lower clamping jaw 28, which will be described in greater detail later. A mouth 29 of the pliers is thus provided between the upper or moving clamping jaw 4 and the lower clamping jaw 28. It should be mentioned at this point that the lower clamping jaw 28 has two stationary jaw walls 30, 31, of which only the rear jaw wall 30 can be seen in FIGS. 1 and 2. Both jaw walls 30 and 31 are shown in FIG. 6. They are located at a distance from one another; are parallel and have upper stop surfaces 32, 33 against which the clamping surface 7 of the upper clamping jaw 4 strikes when the mouth 29 of the pliers is closed. A clamping element 34, which is mounted such that it is flexible downwards, is located between the two jaw walls 30 and 31 and a conductor 36 which is to be stripped comes to rest on its upwardly pointing clamping surface 35, which conductor 36 is then clamped in between the clamping surfaces 7 and 35 while the mouth 29 of the pliers is closing. This will be described in more detail further below.

An essentially horizontally located tension element 37, which is mounted such that it can be displaced in the longitudinal direction of the pliers, is provided in the pliers 1. This tension element 37 is designed in the form of a rod and, at its end pointing towards the mouth 29 of the pliers, has a horizontal through-hole 38 for holding the pivoting pin 39, which is not illustrated in FIGS. 1 and 2. This pivoting pin 39 can be seen, for example, in FIG. 6. In this case, the pivoting pin 39 can also move backwards and forwards in the longitudinal direction of the pliers, that is to say it is not mounted in a fixed position in the pliers housing 2.

The tension element 37 is of fork-shaped design in the direction of the rear end of the pliers and has there two side brackets 40 and 41, which are vertical and are located at a distance from one another. The tension element 37 can be produced, for example, integrally with the side brackets 40 and 41 and from metal. The side brackets 40, 41 are guided in longitudinal slots, of which only the rear longitudinal slot 42 for the side bracket 40 can be seen in FIGS. 1 and 2. These longitudinal slots are located in the side housing walls of the pliers housing 2, and extend in the horizontal direction, or the longitudinal direction of the pliers. They permit a backward and forward movement of the tension element 37.

The tension element 37 is driven via the already mentioned sliding element 18, which comes to rest between the two side brackets 40 and 41. More precisely, the tension element 37 is driven via the convex effective surface 19 of the slide element 18. A horizontal bearing pin 43, which is firmly connected to the side brackets 40 and 41, is located in the region of the free ends of the sliding brackets 40 and 41 for this purpose. All the previously mentioned bearing and pivoting pins are located parallel to one another. Two spacer washers 44 and 45 of identical thickness and between which an actuating head 46 is located on the bearing pin 43 are located on this bearing pin 43, between the side brackets 40 and 41. This actuating head 46 is thus arranged such that it can pivot on the bearing pin 43 and has a convex effective surface 47, which points in the direction of the mouth 29 of the pliers. This convex effective surface 47 is in contact with the convex effective surface 19 of the sliding element 18. An actuating rod 48 is connected integrally to the actuating head 46. This actuating rod 48 is essentially designed as a straight rod and is located in the upper handle 3, or the handle fixed to the housing. That end of the actuating rod 48 which is away from the actuating head 46 is guided between two pins 49a and 49b which are positioned firmly at the rear end of the handle 3. A compression spring 50 is furthermore located on the actuating rod 48 and is supported on the one hand on the pins 49a and 49b and on the other hand, for example, on the rear surface of the actuating head 46. If the handles 3 and 12 are moved towards one another and, at the same time, the actuating rod 48 is pressed to the rear in the direction of the free end of the handle 3 via the convex effective surface 19 and the convex effective surface 47, then the spring 50 is compressed or tensioned. When the handles 3 and 12 are released, the compression spring 50 then presses the tension element 37 in the direction of the mouth 29 of the pliers again. The actuating rod 48 is guided by the pins 49a and 49b throughout the entire movement.

A stripping claw 51 is located in the mouth 29 of the pliers, on the lower side of the moving clamping jaw 4 and behind the clamping surface 7.

This stripping claw 51 is provided at its rear end with a lug 52 in which a through-hole 53 is located. The pivoting pin 39 passes through this through-hole 53 and also passes through the through-hole 38 in the tension element 37. Thus, if the tension element 37 is displaced in the longitudinal direction of the pliers, then the stripping claw 51 is thus also displaced in the longitudinal direction of the pliers at the same time. In this case, a relative displacement takes place between the stripping claw 51 and the moving clamping jaw 4. At the front end, the stripping claw 51 has a suitably designed cutting edge 54 which penetrates into the insulation of a conductor 36, which is clamped in the mouth of the pliers, while the mouth 29 of the pliers is closing. If the mouth 29 of the pliers is closed by pivoting the clamping jaw 4, then the stripping claw 51 is also moved in the direction of the conductor 36, by guidance of the clamping jaw 4. The longitudinal displacement of the insulating claw 51 does not take place until after this, as will be described in more detail later.

The cutting edge 54 can be formed, for example, by cutting tips 55 of a plurality of laminates 56 which are all designed in the same manner and are mounted such that they can pivot about a pivoting shaft 57 which is attached to the side walls of the stripping claw 51. This can best be seen in FIG. 10. An elastic device 58, for example an elastic cushion, can be located underneath the free laminate ends in order to enable flexibility of the laminates 56. The elastic device 58 is in this case supported on a stop 59. If a force is exerted on the laminates 56 as a result of the cutting tips 55 penetrating into the insulation of the conductor which is to be stripped, then the laminates 56 can be displaced to a greater or lesser extent in the clockwise direction about the pivoting shaft 57, the elastic device 58 being compressed on the rear side of the laminates 56, facing away from the cutting tips 55.

The construction of the lower clamping jaw 28 is described in detail in the following text.

As already mentioned, the stationary jaw walls 30, 31 with their upper stop surfaces 32 and 33 belong to the lower clamping jaw 28. The following further devices are provided between the two jaw walls 30 and 31: a laminate cassette 59, a clamping arm 60, a leaf spring 61 and guide tracks 62 for the laminate cassette 59.

As can best be seen in FIG. 2, the laminate cassette 59 is guided on the guide tracks 62, of which only one can be seen in FIG. 2. In fact, there are two guide tracks 62 on both housing side walls of the pliers housing 2, and they are horizontally aligned. The laminate cassette 59 can then rest on these guide tracks 62 and can be moved backwards and forwards corresponding to the longitudinal direction of the pliers. Lateral guidance of the laminate cassette 59 can likewise be effected via the housing side walls of the pliers housing 2.

The drive for the backward and forward movement of the laminate cassette 59 is effected via a coupling of the laminate cassette 59 to the tension element 37. For this purpose, the laminate cassette 59 has a flange 63 which is integrally connected to it and has a through-hole 64 through which the pivoting pin 39, which has already been mentioned, likewise passes. The tension element 37, the laminate cassette 59 via the flange 63, and the insulating claw 51 via the lug 52, are thus mounted such that they can pivot about this pivoting pin 39.

During its backward and forward movement on the guide tracks 62, the laminate cassette 59 is pressed against these guide tracks 62, to be precise with the aid of a compression spring 65 which is arranged in the mouth 29 of the pliers. The upper end of the compression spring 65 is supported in a holder on the lower side of the stripping claw, while the lower end of the compression spring 65 is supported on an adjusting element 66 which is plugged onto the upper side of the laminate cassette 59. This adjusting element 66 can be displaced in the longitudinal direction of the laminate cassette 59 in order to determine how far the end of a conductor can be inserted into the mouth 29 of the pliers. The length of the conductor insulation to be drawn off can thus be predetermined by positioning the adjusting element 66 in the longitudinal direction of the pliers. This adjusting element 66 is used as a stop for the conductor end.

Figure 3:
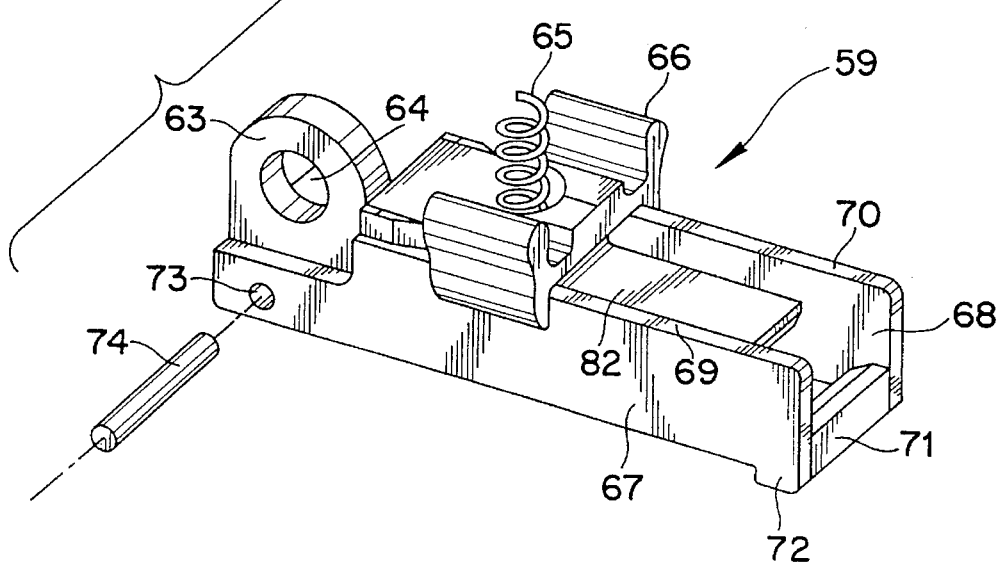
FIG. 3 shows a perspective view of a laminate cassette.

The construction of the laminate cassette 59 can best be seen in FIG. 3.

According to FIG. 3, the laminate cassette 59 is designed essentially in the form of a hollow box and has two side walls 67 and 68. These side walls 67 and 68 are provided at the top with guide surfaces 69, 70 on which the adjusting element 66 rests and can be displaced in the cassette longitudinal direction. The lower surfaces, which are opposite the guide surfaces 69, 70, of the side walls 67 and 68 rest on the guide tracks 62, as already mentioned. At the front end, on the right in FIG. 3, the laminate cassette 59 has a transverse web 71 which is located at the bottom and via which the side walls 67 and 68 are connected and stabilized. In the region of the transverse web 71, the sidewalls 67 and 68 have downwardly directed attachments 72 by means of which the displacement of the laminate cassette 59 in the direction of the rear end of the pliers is limited. In this case, the downwardly pointing edges of the attachments 72 strike against front stop surfaces in the region of the guide tracks 62. At the rear end, on the left in FIG. 3, the laminate cassette 59 is integrally connected to the already mentioned flange 63, which has the through-hole 64 for the guide pin 39. The side walls 67 and 68 are located parallel to one another, while the central axis of the through-hole 64 runs at right angles thereto.

Figure 4:
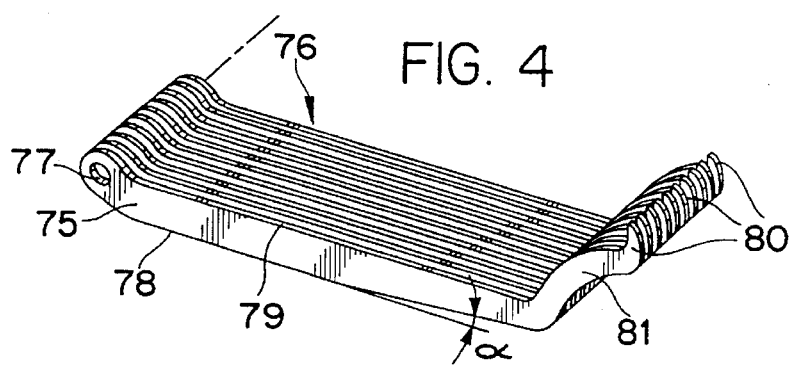
FIG. 4 shows a perspective view of a laminate stack.

There are further through-holes 73 in the side walls 67 and 68, parallel to the through-hole 64, in that region of the laminate cassette 59 which is at the rear and is horizontally as shown in FIG. 3. These through-holes 73 hold a shaft 74 on which a plurality of laminates 75, or a large number of laminates 75, are mounted such that they can pivot. These laminates 75 are relatively thin and are located closely side by side in vertical alignment. In this way, a laminate stack 76 is obtained which can be seen in FIG. 4. Those ends of the laminates 75 which are on the left and at the rear in FIG. 4 are each provided with a through-hole 77 through which the shaft 74 passes. All the laminates 75 can thus pivot freely about the shaft 74. Since the shaft 74 is held between the side walls 67 and 68, the laminate stack 76, in the assembled state, comes to rest within the laminate cassette 59 and in its lower region.

The laminates 75 themselves are designed in the form of flat rods, initially having a constant height in the direction of the front end, starting from the through-holes 77. In this first region, a lower laminate surface 78 thus runs parallel to an upper laminate surface 79. In the further course forwards and to the right in FIG. 4, the lower laminate surface 78 bends upwards slightly in the central laminate region and now runs at a small angle α relative to the upper laminate surface 79. In other words, the height of the laminate now reduces in the direction of its front end. Each laminate 75 is then bent obliquely upwards, that is to say in the direction of the surfaces 69 and 70, in the front region 81, there being provided cutting edges 80 on the free laminate tips which are then obtained. These cutting edges 80 are thus likewise located between the sides 67 and 68 as well as in the front region of the laminate cassette 59, coming to rest underneath the cutting edges 80 of the transverse web 71. However, this transverse web 71 is never touched by the laminates 75 or the upwardly bent laminate sections 81 when the pliers 1 are in operation.

The laminates 75 themselves may be composed of non-elastic or elastic material, for example of steel. After installation in the laminate cassette 59, the laminates 75 are freely accessible from below and are still covered by a transverse wall 82 only in the upper region, for safety reasons. The transverse wall 82 does not, however, extend to the front end of the laminate cassette 59, so that the cutting edges 80 are freely accessible from above. The transverse wall 82 is furthermore located at such a depth that the conductor 36 can still move sufficiently far into the laminate cassette 59 from above and can be acted on by the cutting edges 80.

The already mentioned clamping arm 60 comes to rest underneath the laminate cassette 59. This clamping arm 60 is of L-shaped design and has a long and horizontal limb 83 as well as a short and vertical limb 84. The short and vertical limb 84 is provided at its free and upper end with the clamping element 34, which has the clamping surface 35 at the top. In this case, both limbs 83 and 84 are rigidly connected to one another in this exemplary embodiment. On the other hand, in the rear region, the free end of the long limb 83 has two bearing attachments 85 and 86 which are opposite one another and are designed in a semicircular shape. With these bearing attachments 85 and 86, the clamping arm 60 is located in bearing shells which are located internally on the side walls of the pliers housing 2. The bearing attachment 86 can be seen in FIG. 2. The clamping arm 60 is thus aligned in the pliers such that said arm is located underneath the laminate cassette 59 and virtually holds it. At the same time, the front end of the laminate cassette 59 and/or the transverse web 71 rests on the inner surface of the short limb 84 of the clamping arm 60, while the laminate stack 76 rests on the inner surface 87 of the long limb 83 of the clamping arm 60.

Figure 5:
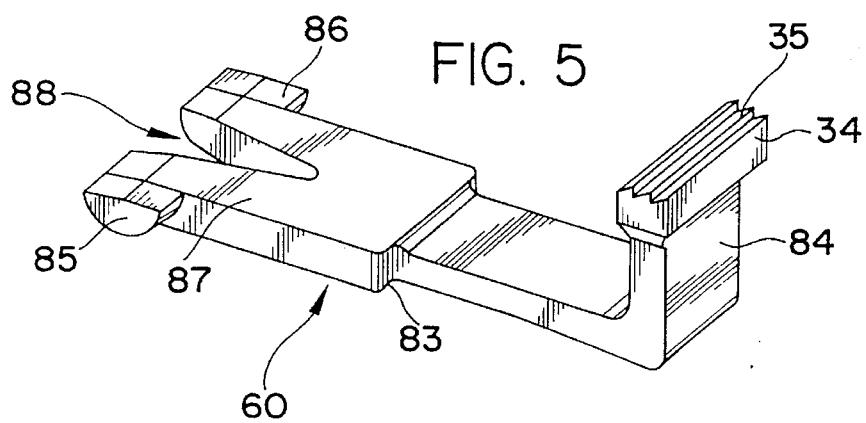
FIG. 5 shows a perspective view of a clamping jaw having a laminate guidance device.

The clamping arm 60, whose construction is shown in detail in FIG. 5, has a V-shaped recess 88 in the region of the long limb 83. This V-shaped recess 88 projects from the free end of the long limb 83 into this limb, and tapers, seen in the direction of the short limb 84, without, however, reaching such short limb 84. Seen in the vertical direction with respect to the inner surface 87, the recess 88 runs through the entire limb 83, however. The more detailed shape of the V-shaped course is determined by the shape of the conductors which are intended to be stripped. In this case, certain clearances are possible depending on the conductor cross-sectional shape. The V-shaped recess 88 is thinner or wider depending on whether the conductors are thinner or thicker. Special designs, matched to special conductor cross-sectional shapes, are also conceivable.

When the pliers are in the quiescent state, that is to say when the mouth 29 of the pliers is completely open, the clamping arm 60 is held in a position such that the inner surface 87 is located parallel to the lower laminate surfaces 78, these lower laminate surfaces 78 touching the inner surface 87. This situation is shown in FIGS. 1 and 2. The V-shaped recess 88 now still has no influence on the relative position of the laminates 75 with respect to one another. The presence of the V-shaped recess 88 has no effect on the relative position of the laminates 75 with respect to one another, which laminates 75 can always move freely downwards about the shaft 74, until the clamping arm 60 is pivoted about the bearing attachments 85 and 86 in the clockwise direction in FIG. 5 during closure of the mouth 29 of the pliers, since the clamping arm 60 is now pressed away downwards as a result of there being a conductor 30 in the mouth of the pliers. In this case, the edge of the V-shaped recess 88 in the region of the inner surface 87 prevents the laminates 75 which are located on the outside being able to pivot a long distance downwards, while this is true to a less severe extent for the central laminates. They can pivot further downwards. Thus, overall, the laminates 75 are pressed into the conductor insulation with a desired force profile corresponding to the shape of the V-shaped recess 88, by the influence of the upper edge of the V-shaped recess 88, which leads to a better and cleaner stripping result.

In this case, the position of the clamping arm 60 can also be preset in the longitudinal direction of the long limb 83, to be precise by means of a plurality of holders, which are located one behind the other, for the bearing attachments 85 and 86, in order in consequence to allow the contact-pressure forces to be preset in a general manner.

As soon as the mouth 29 of the pliers has closed and the insulation of the conductor which is clamped in the mouth 29 of the pliers has been cut through, the laminate cassette 59 is moved in the direction of the rear end of the pliers and, with it, the laminate stack 76. At the same time, the pivoted clamping arm 60 maintains its pivoted position and is also not moved in the longitudinal direction of the pliers, so that the laminate stack 76 is drawn over the edge of the V-shaped recess 88, which edge is located in the inner surface 87. As long as the height of the laminates 75 does not change, that is to say the distance between the lower laminate surface and the upper laminate surface 78, 79 remains constant, there is no further relative pivoting of the laminates 75 with respect to one another. However, if that region of the lower laminate surface 78 which is bevelled at the angle α moves onto the said edge of the V-shaped recess 88, the individual laminates 75 can flex further and drop downwards so that the cutting edges 80 are now slightly released from the metallic conductor core and can no longer scratch it. However, as before, the cutting edges 80 engage behind the cut-through conductor insulation in order to draw it off the conductor core. The process will be explained in detail later.

As can best be seen in FIG. 2, the leaf spring 61 is arranged under the clamping arm 60 which is shown in FIG. 5. This leaf spring 61 has a rear broad end 89 and tapers in the direction of the front end of the pliers. It is fastened by means of its rear broad end 89 to the side walls of the pliers housing 2. To this end, the mutually opposite side regions of the broad end 89 can engage firmly in side wall slots in the pliers housing 2. The elastic tip region 90 of the leaf spring 61 presses against the base or long limb 83 of the clamping arm 60 and holds it in the horizontal position when the pliers are in the quiescent position with the mouth 29 of the pliers open, as can likewise be seen in FIG. 2. If the conductor 36 comes to rest on the short limb 84 of the clamping arm 60, and if the latter is pivoted by the conductor 36 about the bearing attachments 86, then this pivoting takes place against the force of the leaf spring 61 which in consequence makes available the necessary cutting force. In this case, the leaf spring 61 is responsible not only for producing the cutting force but also for providing the clamping force to clamp the conductor 36 in. In this case, it is thus a very robust and correspondingly designed leaf spring. It can also be replaced by springs of a different type, which can be arranged inside the lower clamping jaw and underneath the clamping arm 60.

FIGS. 6 to 9a show a second exemplary embodiment of stripping pliers according to the invention. Identical elements to those in FIGS. 1 to 5 are provided with the same reference symbols and are not described again.

Figure 9A:
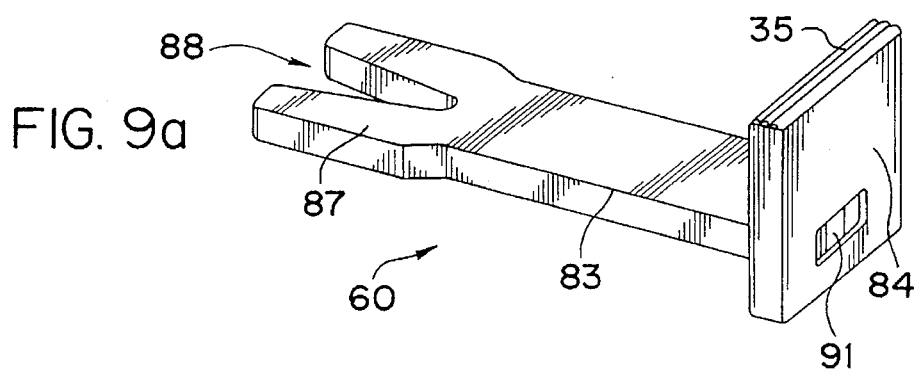
FIG. 9a shows a clamping jaw, which is of articulated design, having a laminate guidance device.
Figure 10:
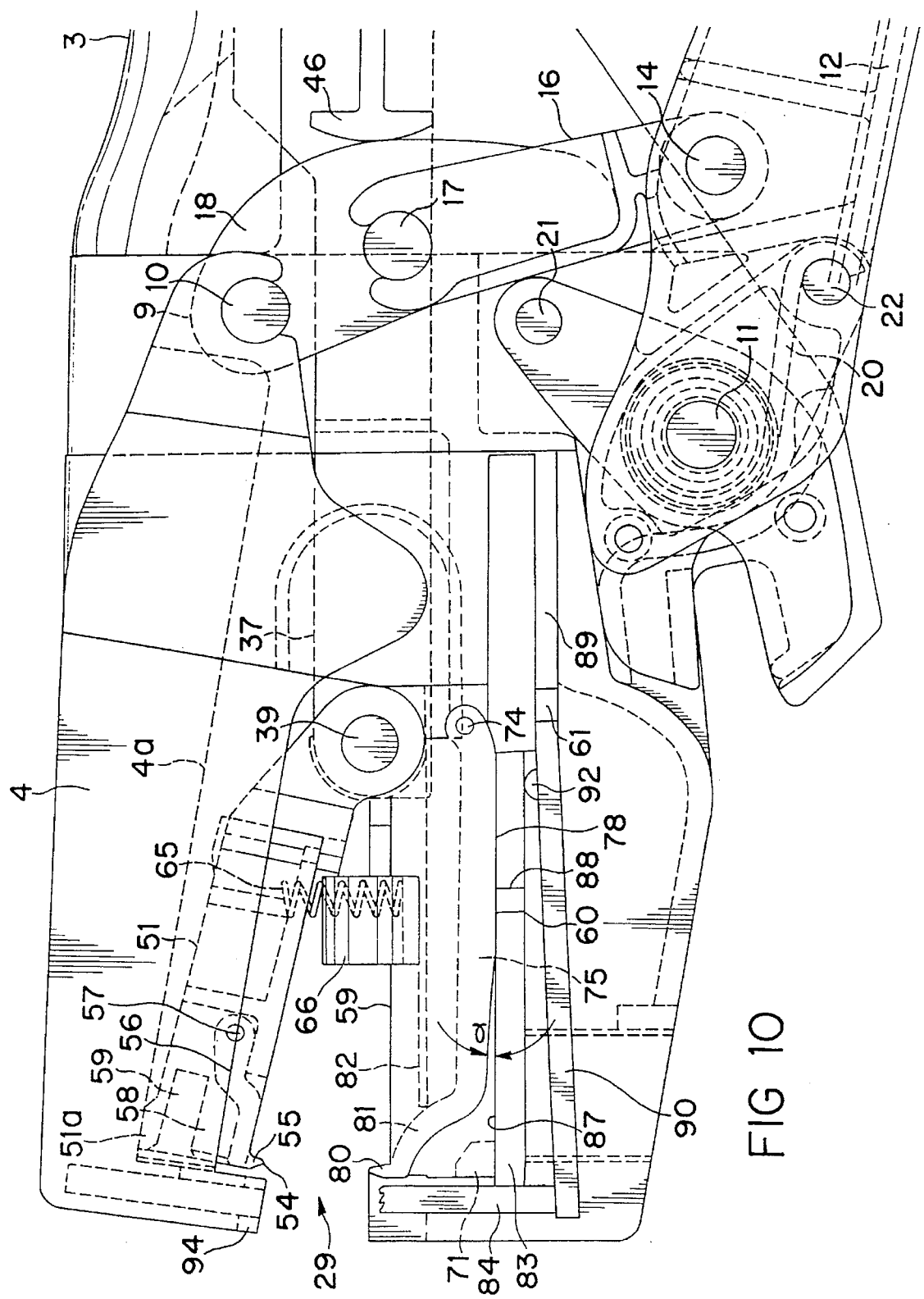
FIG. 10 shows a side view of the pliers according to the further exemplary embodiment, with the mouth of the pliers open.

In contrast to the first exemplary embodiment, the construction of the clamping arm 60 of the second exemplary embodiment is in accordance with FIG. 9a. The essential difference is that, in this case, the long limb 83 and the short limb 84 are connected to one another in an articulated manner. For this purpose, both limbs 83, 84 can be connected, for example, to elastic angle brackets 91 which are inserted firmly into the respective limbs 83, 84. Otherwise, the long limb 83 has a continuous and/or flat guide surface 87 on its inside. In order to prevent the clamping arm 60 being displaced in the direction of the rear end of the pliers while the conductor insulation which has been cut through is being drawn off the conductor, a corresponding stop can be provided at the free end of the long limb 83, which stop is provided on the side walls of the pliers housing 2. In FIG. 6, this stop would come to rest somewhat above the rear and broad end 89 of the leaf spring 61. The rear and free end of the long limb 83 of the clamping arm 60 according to the second exemplary embodiment also no longer has any separate bearing attachments, as is still the case in the first exemplary embodiment. Instead, this end can be mounted on bearing attachments 92 (see FIG. 10) which are located on the side walls of the bearing housing 2. The bearing attachments 92 can also be replaced by one continuous bearing rod, the bearing rod being located above the leaf spring 61 in this case. In FIG. 10, the leaf spring 61 would then have to be passed around the corresponding bearing rod. Otherwise, it can still be seen in FIG. 6 that the front and lower region of the lower clamping jaw 20 can be covered by further wall elements 93.

Figure 9B:
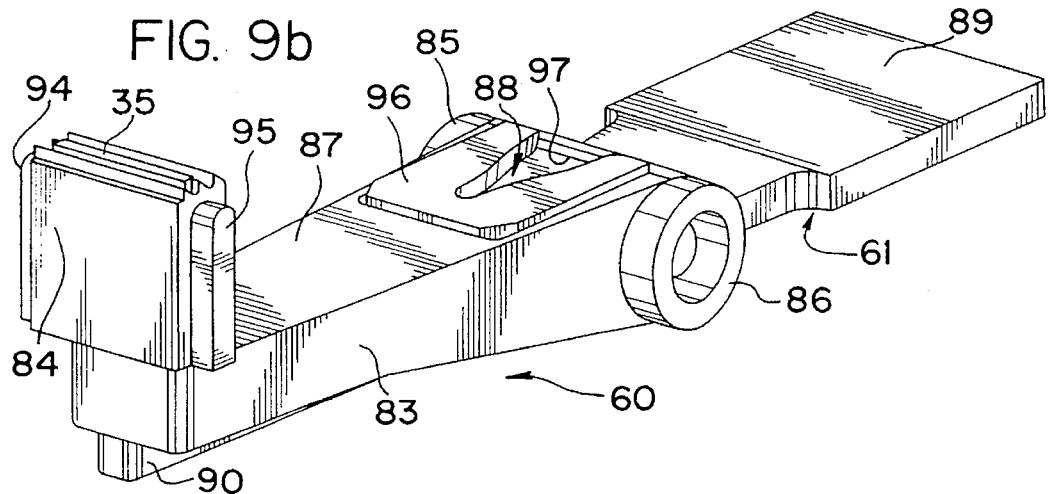
FIG. 9b shows a further clamping jaw having an inserted laminate guidance device.

A third exemplary embodiment of stripping pliers according to the invention is illustrated in FIG. 9b. The construction of the clamping arm 60 once again differs from that of the first and second exemplary embodiments. Identical elements to those in the preceding exemplary embodiments are provided with identical reference symbols and are not described again.

In the case of the third exemplary embodiment according to FIG. 9b, guide attachments 94 and 95 are located on both sides of the short limb 84, which guide attachments 94 and 95 extend in the vertical direction and engage in guide grooves which are located on opposite inside surfaces of the pliers housing. Once again, the short limb 84 is mounted such that it can pivot with respect to the long limb 83 of the clamping arm 60. The free end of the long limb 83 of the clamping arm 60 is provided with lateral bearing attachments 85, 86 which are located in corresponding recesses in the side surfaces of the pliers housing. These bearing attachments 85, 86 are in this case designed in the form of circular rings and exhibit only a small amount of wear. They can be integrally connected to the clamping arm 60. Alternatively, in this case they can be circular attachments made of low-wear material, for example high-strength metal, which attachments can be plugged, for example, onto corresponding cylindrical attachments (not illustrated) which, for their part, are integrally connected to the clamping arm 60.

In the case of this exemplary emodiment, the laminate guidance device is designed as a part 96 which is in the form of a plate and can be inserted in a fitting manner into a flat recess 97. This flat recess 97 is located in the upper surface 87 of the clamping arm 60. The V-shaped recess 88, which becomes broader with increasing distance from the short limb 84, is once again provided in the part 96 which is in the form of a plate. As already mentioned, the part 96 which is in the form of a plate is inserted in a fitting manner and without any play into the flat recess 97 and can, for example, likewise be made of low-wear material, for example of high-strength metal.

The method of operation of the pliers is described in more detail in the following text, with reference to FIGS. 10 to 12.

FIG. 10 shows the pliers in the quiescent position, that is to say with the mouth 29 of the pliers open to its greatest extent. In this situation, the stripping claw 51 and the laminate cassette 59 are pressed apart from one another by the spring 65, the laminate cassette 59 being pressed onto the guides 62. As a result of the influence of the elastic device 58, the cutting tips 55 of the laminates 56 project to the greatest extent and protrude into an end conductor holder 94 in the upper clamping jaw.

The long limb 83 of the clamping arm 60 is held in its uppermost position by the spring 61 or by its elastic tip region 90, in which uppermost position it is located horizontally or parallel to the guide tracks 62. The laminates 75 rest with their lower laminate surface 78 on the planar or horizontal inner surface 87 of the long limb 83 and are likewise located in their original position in which the cutting edges 80 point upwards to the greatest extent. The V-shaped recess 88 in the long limb 83 of the clamping arm 16 now does not produce any relative pivoting of the individual laminates 75 with respect to one another. In FIG. 10, it is assumed that only the central laminate 75 of the laminate stack 76 can be seen. As shown, the lower laminate surface 78 is guided slightly upwards from about the central laminate region in the direction of the front end of the pliers, before the laminate merges into the laminate section 81. The angle α, which has already been explained in FIG. 4, is then present between this bent laminate surface region and the inner surface 87. It should also be mentioned that the tip end of the V-shaped recess 88 is shown by a dashed line in FIGS. 10 to 12, which dashed line also marks the support for the central laminate 75.

Figure 11:
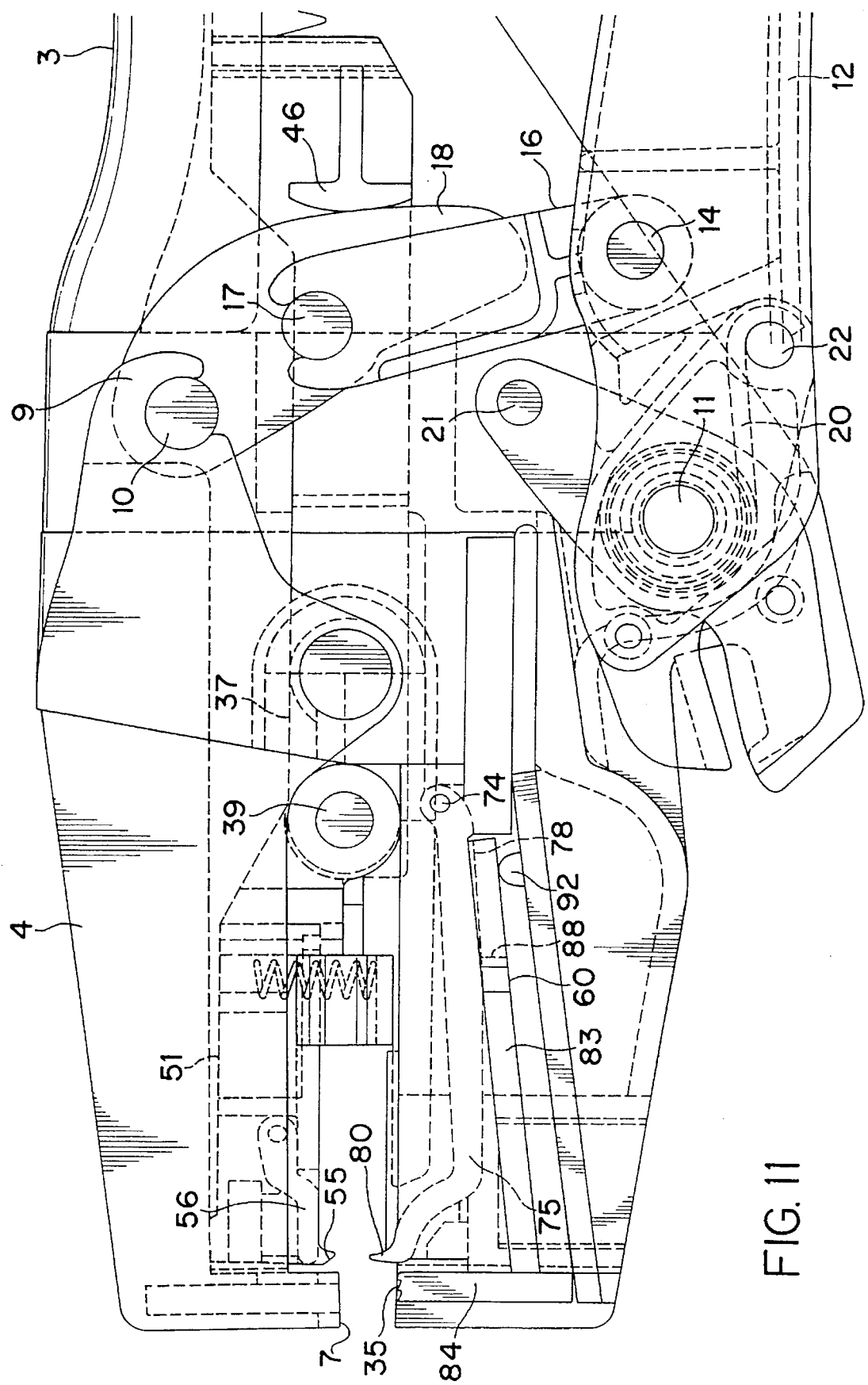
FIG. 11 shows a side view of the pliers according to FIG. 10 with the mouth of the pliers closed.
Figure 12:
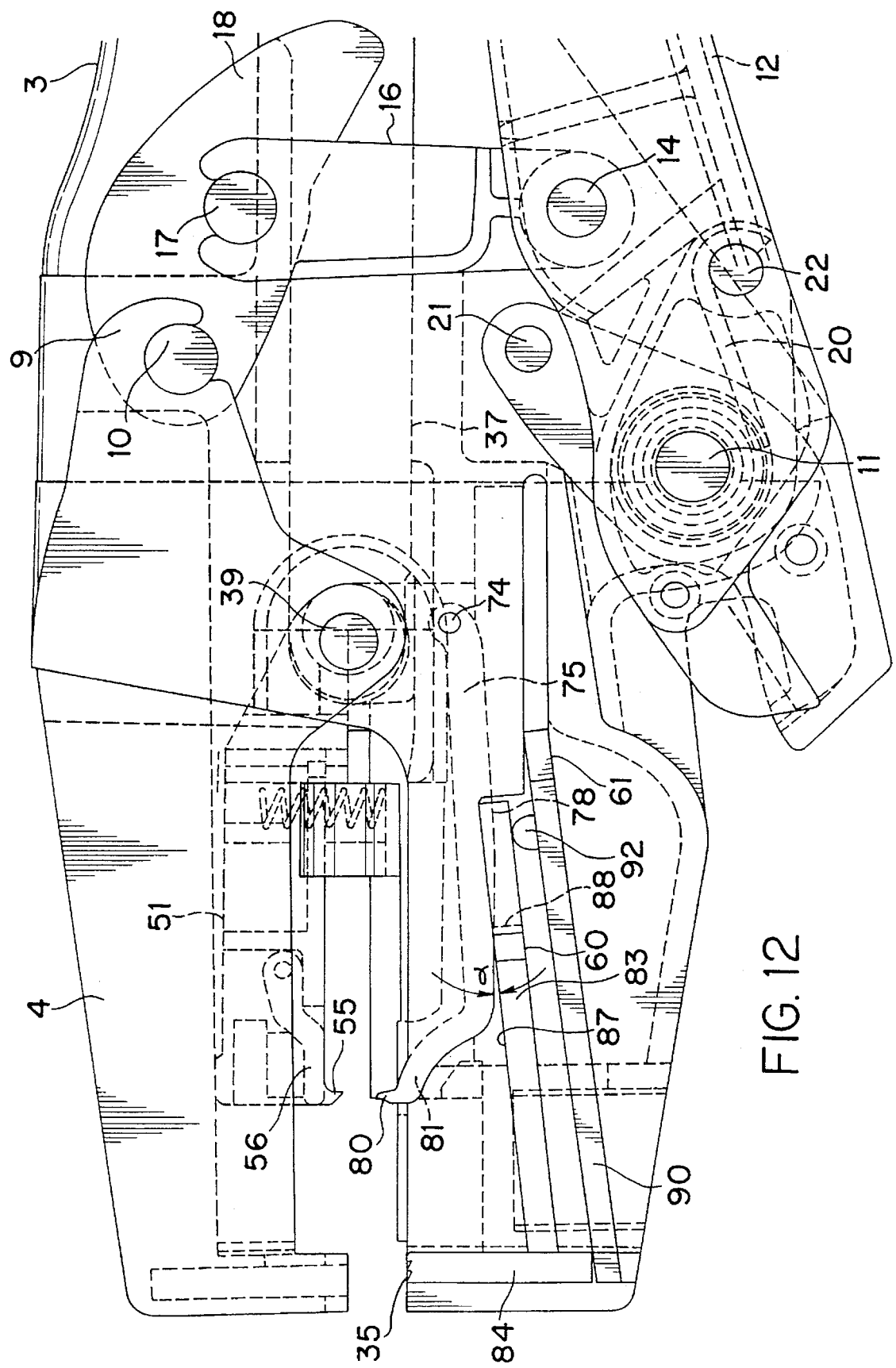
FIG. 12 shows a side view of the pliers according to FIG. 10 with the mouth of the pliers closed and the stripping devices retracted or withdrawn.

If the handles 3 and 12 are now pressed together, then the upper clamping jaw 4 in FIGS. 10 to 12 is rotated counter clockwise about the bearing pin 39, via the toggle-lever joint which has already been mentioned. In this case, the sliding element 18 initially still does not produce any displacement, or only a very small amount of displacement, of the actuating head 46 towards the rear end of the pliers. The mouth 29 of the pliers is now closed when the handles 3 and 12 have not yet been completely moved together, and the cutting tips 55 as well as the cutting edges 80 penetrate into the conductor, which is not illustrated and is clamped in the mouth of the pliers. In this situation, the clamping surface 7 in FIG. 1 strikes against the upper stop surfaces 32, while the conductor 36, which is located on the clamping surface 35 of the clamping element 34, is pressed downwards by the clamping surface 7, to be precise against the force of the spring 61. At the same time, the clamping arm 60 is correspondingly deflected downwards.

The short limb 84 of the clamping arm 60 is thus pivoted against the force of the spring 61 and about the bearing attachment 92 as a result of the clamping force produced in the mouth of the pliers, so that the V-shaped recess 88 can now ensure relative displacement of the individual laminates 75 with respect to one another. The central laminate can be deflected downwards to the greatest extent, since the support which is formed by the upper edge of the V-shaped recess 88 is furthest forwards for it. The lateral laminates 75 of the laminate stack 76 cannot be deflected downwards to such a great extent as a result of the V-shaped recess 88, however, so that they can penetrate better into the lateral conductor insulation regions. The cutting edges 80 of the laminates 75 thus fit better around the contour of the conductor 36 as a result of the V-shaped recess 88 and penetrate to a greater extent into the conductor insulation particularly in the lateral region, since the lateral, or externally located, laminates 75 can no longer flex to such a great extent. A better or cleaner stripping result is thus achieved.

It can clearly be seen in FIG. 11 that the lower laminate surface 78 projects to a greater and greater extent into the V-shaped recess 88 towards the rear end of the pliers. This situation approximately marks the situation of greatest clamping force or cutting force in the mouth of the pliers.

If the handles 3 and 12 are now completely pressed together according to FIG. 12, then the rear free end of the sliding element 18, which overhangs the pivoting pin 17 in the direction of the pivoting pin 14, pivots out to the greatest extent in the direction of the rear end of the pliers and thus presses the actuating head 46 into its rearmost limit position. This leads to the laminate cassette 59 also being moved into its rearmost limit position and, with it, the stripping claw 51. The clamping arm 60 remains in its pivoted position, but the laminates 75 now slide with their lower laminate surface 78 over that edge in the surface 87 which is defined by the V-shaped recess 88. At the same time, in the course of this movement which is carried out to the rear, that region of the lower laminate surface 78 which is bent through the angle α also comes to rest on the the edge (support), so that the central laminate 75 of the laminate stack 76 and the laminates 75 located adjacent to it are now lowered. This leads to the cutting edges 80 moving slightly away from the core of the conductor 36, but without disengaging from the insulation. The lowering for the laminates 75 located on the outside of the laminate stack 75 is not quite so great, but also, on the other hand, is unnecessary since the laminates 75 here move past the conductor core at the sides.

During movement of the laminate cassette 59 which is carried out to the rear, the upper stripping device 51 is also moved to the rear, being supported via an attachment 51a, which is located at the top and front, on an internally located guide surface 4a of the upper operating jaw 4. When the handles 3 and 12 are released, they are spread again by the spring 20 while, at the same time, the compression spring 50 pushes the tension element 37 forwards again and, with it, the stripping claw 51 and the laminate cassette 59. The mouth 29 of the pliers is additionally opened again by the spring 65, and the spring 61 presses the clamping arm 60 back into its original position.

We claim:

1. A device for stripping conductor ends comprising:

clamping jaws;

two stripping devices arranged in a mouth formed by said clamping jaws, said two stripping devices being displaceable in a longitudinal direction of said mouth;

a plurality of laminates located side-by-side to form a stack of laminates positioned on at least one of said two stripping devices, said stack of laminates being displaceable in a direction transverse to said longitudinal direction of said mouth, each laminate having a cutting edge for penetrating insulation of a conductor held by said clamping jaws when said mouth is closed; said laminates being displaceable relative to each other in said traverse direction and a laminate guidance means which is matched to a profile of a conductor for providing relative transverse displacement of said laminates in accordance with the profile.

2. The device according to claim 1, wherein said laminate guidance means is located on a rear side of said stack of laminates.

3. The device according to claim 1, further comprising means for pivotally mounting said laminate guidance means.

4. The device according to claim 3, wherein said laminate guidance means is part of one of said clamping jaws.

5. The device according to claim 4, wherein said laminate guidance means is integral with said one of said clamping jaws.

6. The device according to claim 4, wherein said one of said clamping jaws is articulated.

7. The device according to claim 4, wherein said one of said clamping jaws can be positioned at various positions along said longitudinal direction of said mouth.

8. The device according to claim 4, further comprising means for pivotally maintaining said one of said clamping jaws in the region of said laminate guidance means.

9. The device according to claim 1, further comprising means for slidably displacing said stack of laminates in said longitudinal direction of said mouth on said laminate guidance means and wherein a lower laminate surface of said stack of laminates is bent towards said cutting edges in a front region of said stack of laminates.

10. The device according to claim 9, further comprising a laminate cassette which pivotally mounts said stack of laminates and a tie rod, displaceable in said longitudinal direction of said mouth, connected to said laminate cassette.

11. The device according to claim 4, further comprising a spring, located on a rear side of said one of said clamping jaws, which presses said one of said clamping jaws in the direction of said mouth.

12. The device according to claim 11, wherein said spring is a leaf spring which runs in said longitudinal direction of said mouth and is mounted at a rear end of said mouth.

13. The device according to claim 3, wherein said one of said clamping jaws is arranged between stationary housing parts against which the other of said clamping jaws is moved during closure of said mouth.

14. The device according to claim 10, wherein another of said two stripping devices is coupled to said tie rod.

15. The device according to claim 14, further comprising a compression spring provided between said another of said two stripping devices and said laminate cassette which presses said laminate cassette against guide surfaces onto which said laminate cassette can be displaced.

16. The device according to claim 10, further comprising two handles, said mouth being closed and said tie rod being guided to a rear end of the laminate guidance means when said two handles are moved together.

17. The device according to claim 4, wherein said laminate guidance means is an insertion part.

18. The device according to claim 17, wherein said insertion part is a plate having a V-shaped recess at an edge thereof.

19. The device according to claim 18, further comprising a recess in an arm of said one of said clamping jaws which can receive said plate.

20. A method of stripping conductor ends comprising the steps of arranging a laminate stack comprising a plurality of side-by-side laminates in a mouth formed by clamping jaws;

matching a profile of a conductor with a laminate guidance device;

mounting said laminate guidance device on a rear side of said laminate stack;

holding a conductor in said clamping jaws;

penetrating insulation of the conductor by cutting edges of said laminate stack; and controlling relative movement of said laminates transverse to a longitudinal direction of said mouth in accordance with said laminate guidance device and said profile.

* * * * *